July 13, 1965 J. UBBELS ETAL 3,193,927
APPARATUS AND PROCESS FOR SEPARATING WHEY
FROM CUT COAGULATED MILK
Filed June 4, 1962 3 Sheets-Sheet 1

INVENTORS
Jacob Ubbels,
Johan Teun Van Der Linde
BY Stevens, Davis, Miller & Mosher
ATTORNEYS

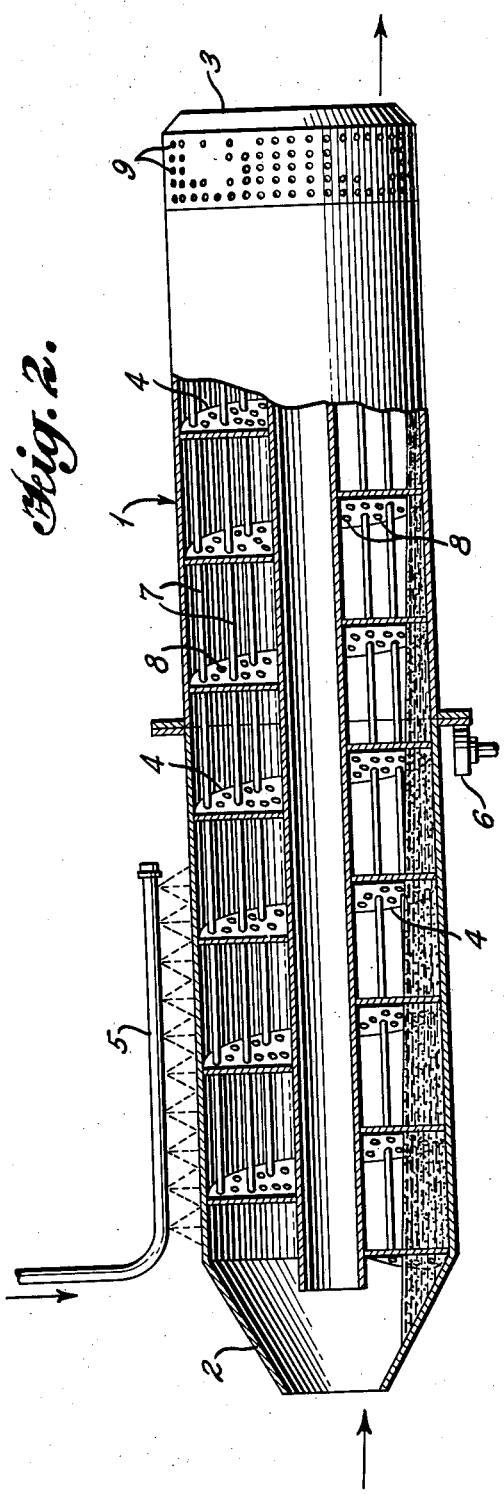
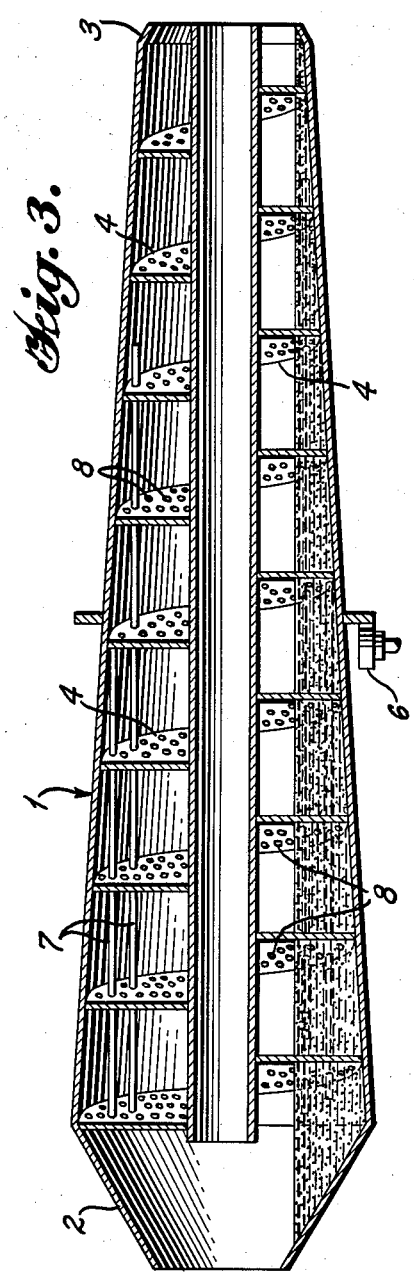
INVENTORS
Jacob Ubbels,
Johan Teun Van Der Linde
BY Stevens, Davis, Miller & Mosher
ATTORNEYS July 13, 1965 J. UBBELS ETAL 3,193,927
APPARATUS AND PROCESS FOR SEPARATING WHEY
FROM CUT COAGULATED MILK
Filed June 4, 1962 3 Sheets-Sheet 3
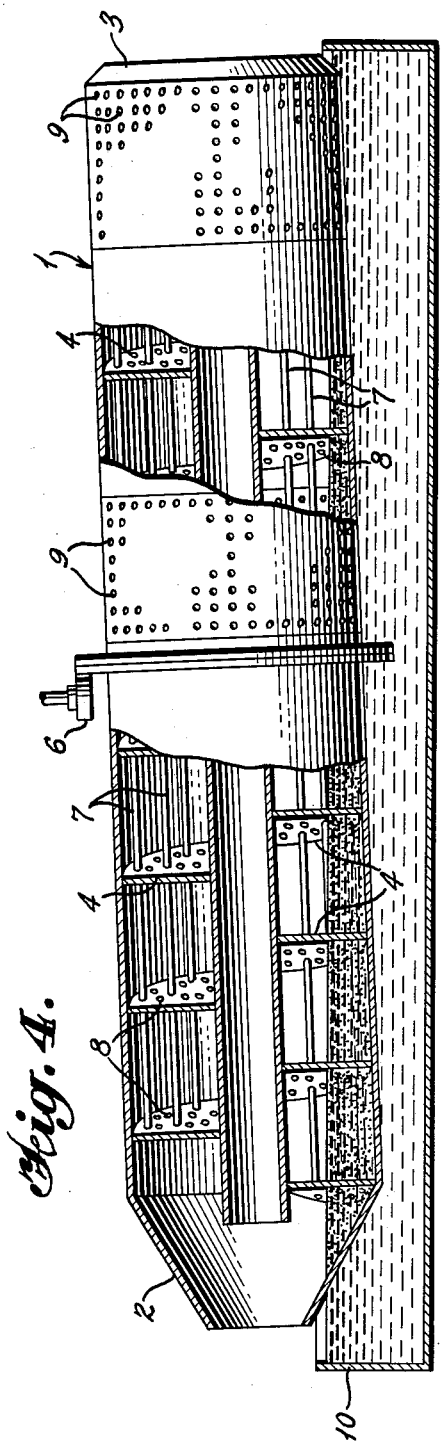
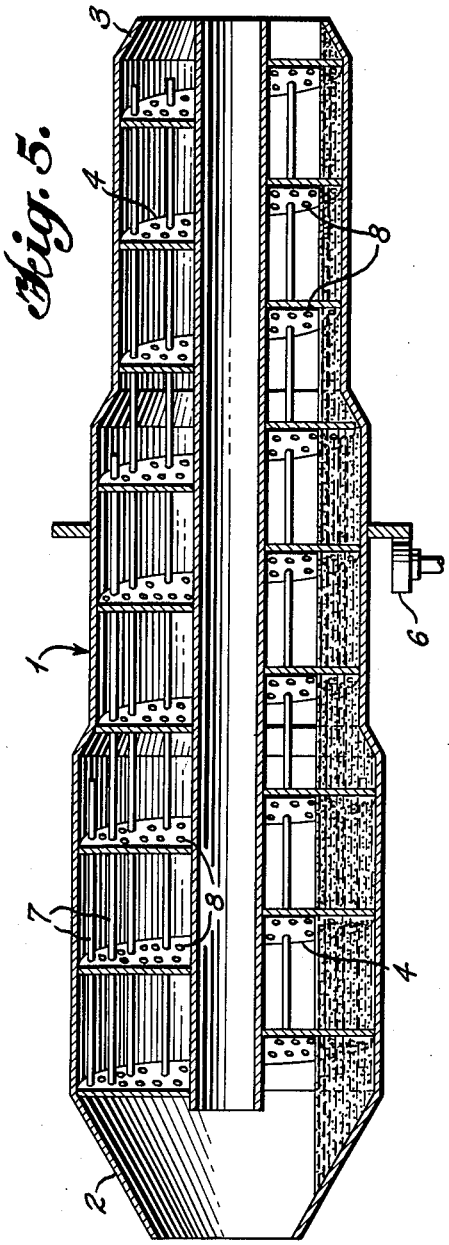
INVENTORS
Jacob Ubbels,
Johan Teun Van Der Linde
BY
Stevens, Davis, Miller & Mosher
ATTORNEYS

3,193,927
APPARATUS AND PROCESS FOR SEPARATING WHEY FROM CUT COAGULATED MILK

Jacob Ubbels and Johan T. van der Linde, Ede, Netherlands, assignors, by mesne assignments, to Bedrijven van Het Nederlands Instituut voor Zuivelonderzoek, Ede, Netherlands, an institution of the Netherlands
Filed June 4, 1962, Ser. No. 199,830
Claims priority, application Netherlands, June 5, 1961, 265,559
4 Claims. (Cl. 31—46)

The invention relates to an apparatus for separating whey from cut coagulated milk, comprising a tubular body, adapted to rotate about its longitudinal axis, in which a screw-shaped member is present, being connected with the walls of the tubular body so as to rotate along with it and the opening at the receiving end of the tubular body being partly shut off by a collar, as well as the process for carrying out said separation.

In the conventional process for making cheese in vats the separation of the whey starts as the coagulated milk is being cut. This process of separation consists of the exudation of whey out of the curd particles, followed by the discharge of the exudated whey from the resulting mixture of whey and curd. After the coagulated milk has been cut into sufficiently small lumps, stirring is continued to accelerate the separation of the whey and to prevent curd particles sinking to the bottom of the vat and sticking together. The separation of whey can be accelerated by raising the temperature of the whey-curd mixture. In order to obtain the desired content of moisture and lactose of the cheese, after some stirring a portion of the whey is usually allowed to flow off and replaced partly by hot water, which at the same time causes a desirable rise of the temperature of the mixture. It is also possible to heat a portion of the separated whey and add it again, or to heat the mixture in the double-walled cheese vat with the aid of steam or hot water. Stirring is continued until the curd is considered by the cheese-maker to be suitable to be moulded or pressed into a mould. The mixture of water and whey is then discharged. The time required from the moment at which cutting is started to the discharge of the last whey is usually 60 to 80 minutes.

Several apparatuses and processes have already been proposed for carrying out the above-mentioned operations in a shorter time and continuously. Thus it has been proposed in the U.S. patent specification 2,781,269 to promote the separation of the whey by introducing the cut coagulated milk into a horizontal tubular body in which a screw-shaped body is adapted to rotate. This screw-shaped rotating body conveys the curd in the longitudinal direction of the tubular body. The apparatus is equipped with a heatable by-pass conduit in which whey can be heated, by which means the whey curd mixture in the horizontal tubular body can be maintained at the desired temperature, while the excess of whey can be discharged from the horizontal tubular body by means of a drawing-off device likewise present.

According to the U.S. patent specification 2,917,827 a similar apparatus is used for the separation of the whey from the cut curd. Moreover, in this apparatus the screw-shaped body is provided with strips mounted parallel to the longitudinal axis of the screw and scraping along the wall of the drum, by which means a good mixing and stirring effect is promoted and at the same time the wall of the drum is kept clean.

The apparatuses according to the U.S. patent specifications 2,781,269 and 2,917,827 have at least two considerable disadvantages. At first the screw rotating relative to the wall will pulverize the curd particles between screw and wall, thus producing so-called curd dust, which is discharged along with the whey, thus reducing the cheese output. Secondly the presence of bearings, and in the apparatus according to U.S. patent specification 2,781,269 even of gear wheels, has bacteriological disadvantages because such an apparatus is difficult to clean.

In the process according to U.S. patent specification 2,782,122 a horizontal cylinder containing no screw-shaped body is used for the separation of the whey from the cut coagulated milk. However, the cylinder used in this process, has a partially perforated wall, through which the whey can flow off. Mounted in the cylinder parallel to the axis is furthermore a breaker device equipped with rods. This cylinder is filled discontinuously with a whey-cured mixture which has previously been stirred until sufficient whey has been separated from the curd.

Now it was found that the separation of the whey from cut coagulated milk takes place much more rapidly if this operation is carried out in an apparatus comprising a tubular body adapted to rotate about its longitudinal axis in which a screw-shaped member is present, being connected with the walls of the tubular body so as to rotate along with its and the opening at the receiving end of the tubular body being partly shut off by a collar and moreover the lower boundary of the vertical longitudinal cross-sectional plane through the longitudinal axis of said tubular body, from the receiving end to the discharge end is inclined substantially continuously or discontinuously, the tubular body at most along a part of its length is perforated, the screw-shaped body is perforated along a part of its length and moreover one or more stirring devices are present inside of the tubular body.

In a preferred embodiment the tubular body is a cylinder with stirring beams extending parallel to the longitudinal axis of the cylinder, while the perforations in the screw-shaped and the tubular body are such that the curd particles cannot pass through them.

In a special embodiment of the apparatus the wall of the tubular body is perforated only near the end placed at the highest level.

When the tubular body is built up of cylinders having different diameters, which are interconnected by means of connecting members that may or may not be conical, and/or when use is made of different slopes or the body is given a conical shape, it is possible to arrive at a great many variations, each of which may have certain advantages.

In the preparation of curd which is sufficiently dry for cheese-making, cut coagulated milk is introduced at the receiving end into the tubular body of the apparatus described above, the body is rotated about its longitudinal axis with or without being heated or cooled, and the curd is discharged at the discharge end.

The temperature of the whey-curd mixture in this process is preferably between 25 and 40° C.

Curd of the desired consistency can be obtained very quickly and efficiently by further processing of cut coagulated milk, prepared according to U.S. patent applications 122,690 of 1961, now Patent No. 3,132,026, and 227,103 of 1962, in the apparatus described above.

The great advantage of the combination of these two processes will at once be obvious if it is borne in mind that with the present process the time needed for the separation of the whey from milk that has been coagulated and cut according to the process of U.S. patent applications 122,690 of 1961, now Patent No. 3,132,026, and 227,103 of 1962, is reduced to one tenth of the previously required time, whilst with milk that has been coagulated and cut in the conventional way the time needed for the separation of the whey is reduced to one fourth of the normal time.

The invention is illustrated in greater detail by the following figures. Of these figures, FIGURE 1 is a side view in elevation of a cylindrical form of the apparatus embodying the present invention, the cylinder wall having no perforations;

FIGURE 2 shows a longitudinal cross-section partly in elevation, of the apparatus, in an embodiment in which the cylinder wall is partly perforated;

FIGURE 3 is a longitudinal cross-section of a conical form of the apparatus, the wall having no perforations;

FIGURE 4 is a longitudinal cross-section, partly in elevation of an embodiment in which the apparatus is placed in a tank, the cylinder wall being fully or partly perforated;

FIGURE 5 is a longitudinal cross-section of the apparatus with a stepwise tapering tubular body, the tubular wall having no perforations; all cross-sections having been taken in a vertical plane through the axis of the apparatus.

Figure 1:
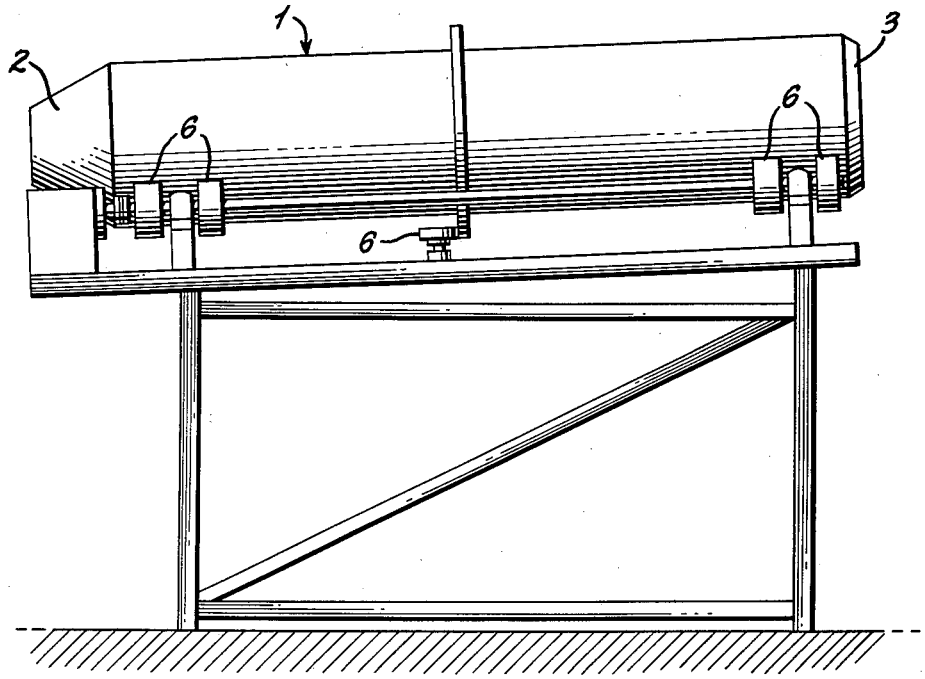

An embodiment of the apparatus according to the invention is illustrated diagrammatically in FIGURES 1 and 2. A power-driven cylinder 1, not fully horizontally supported by the rollers 6, is equipped at the receiving end with a cone 2 and at the discharge end with a smaller cone 3. Mounted inside the cylinder is a screw-shaped body 4.

The screw-shaped body 4 is provided with holes 8, so that they whey can freely flow in the longitudinal direction of the cylinder, but the curd cannot. When the cylinder rotates, the curd particles are conveyed between the walls of the cylinder and the helical blades of the screw-shaped body in the longitudinal direction of the cylinder. In FIGURE 1 it can be seen that the longitudinal axis of the cylinder slopes upwards from the curd receiving end to the discharge end. By varying the angle of slope it is possible to control, in cooperation with the cones 2 and 3, the thickness of the liquid layer in the cylinder. In the embodiment shown in the drawing the liquid layer is thicker at the beginning of the cylinder than at the end. Owing to the exudation of whey the curd volume decreases from the receiving to the discharge end. Owing to this construction the ratio curd volume: whey volume as the curd approaches the discharge end is greater than with a horizontal cylinder. In consequence the contact between the particles is more intensive, and accordingly drying is more rapid than with a horizontal cylinder. Extending through the screw-shaped body in the longitudinal direction of the cylinder are a number of rods 7. During the rotation of the cylinder these rods move through the curd-whey mixture and produce the desired stirring effect. The rate at which the whey is separated from the curd is affected not only by the temperature already mentioned, but also by the number of stirring rods, the circumferential velocity of the cylinder, and the ratio curd volume: whey volume.

In the embodiment of FIG. 2 and also that of FIGS. 3 and 5 the thickness of the liquid layer in the cylinder is controlled by the angle of slope of the longitudinal axis of this cylinder, in cooperation either with the cones 2 and 3, if the cylinder wall is not perforated as in FIGS. 3 and 5 or with cone 2 alone in case perforations have been provided as in FIG. 2. It is also possible to control this thickness by placing a perforated cylinder in a tank 10 through the level of the separated whey in this tank together with the slope of the cylinder axis. This embodiment is illustrated in FIG. 4.

When the cylinder has the right dimensions, the curd at the end of the cylinder is fit for separation from the whey exudated. This process of separation can take place outside the cylinder, but also in the cylinder itself. In the latter case the discharge end of the cylinder wall has a number of perforations 9. The place where the whey is drawn off can also be shifted to an earlier moment by providing the perforations in another part. If necessary, rinsing water may be added to the curd from which the whey has flown off. This rinsing water may or may not be discharged ahead of the discharge end of the cylinder through another perforated part of the cylinder. The temperature of the whey-curd mixture in the cylinder can be controlled, for instance, by spraying hot or cold water on or into the cylinder (by means of sprayer 5, for instance). The curd-whey mixture may also have been brought to the desired temperature already before flowing into the cylinder.

It will at once be obvious that the apparatus described above is eminently suited to be incorporated in a continuous process.

The disadvantages inherent in the known apparatus do not attach to the present apparatus. The strips fitted to the screw according to the U.S. patent specification 2,917,827 in order to keep the wall clean are not needed in the apparatus according to the invention, and they are even undesirable because pollution may occur between wall and strip. To promote the stirring effect, stirring rods are provided which are so far removed from the wall that no pollution can occur.

*Example I*

Cut coagulated milk was prepared according to the process of Example I of Dutch patent application 253,-654. The capacity of the apparatus used was 540 litres per hour. The product obtained was introduced at the inlet end into the rotating cylinder (diameter 400 mm.) of the separator described above. The temperature of the product was raised from 30 to 35° C. in the first part (length 1,000 mm.) of the rotating cylinder (total length 3,670 mm.) with the aid of hot water which was sprayed on the outside of the cylinder. The slope of the cylinder was 1:40, the cylinder rotated at a speed of 6 r.p.m. Since the number of threads of the screw-shaped body was 45, the average time during which the curd was in the rotating cylinder was 7.5 minutes. The condition of the curd as it left the cylinder was such that good cheese could be made from this curd.

*Example II*

The same cut coagulated milk was introduced into an apparatus as referred to in Example I, under identical circumstances, but for the fact that at the end of the rotating cylinder there was a perforated part (length 200 mm.). In consequence, most of the whey was discharged through the perforation and the curd left the end of the cylinder in reasonably dry condition. Outside the cylinder this curd was rinsed with water and made into cheese.

*Example III*

This example is identical with Example II, with the exception of the place of the perforated part of the cylinder. The perforated part was now provided 1,000 mm. further ahead, so that a portion of the whey was discharged at an earlier moment than in Example II. After having passed through the perforated part, the curd was sprayed with water of 35° C., by which means the curd was rinsed somewhat. The spraying water flowed to the perforated part, where it left the cylinder along with the whey.

Dependent on the method of preparing the curd according to Example I, II or III, the water content and the lactose content of the curd leaving the cylinder will vary.

What we claim is:

1. Apparatus for separating whey from cut coagulated milk, comprising a tubular body open at opposite ends and having its longitudinal axis vertically inclined with respect to the horizontal plane, the vertically lower open end of said body being the receiving end and the opposite end therefrom the discharge end, means supporting said body to permit it to be rotated, said body being perforated along at most a portion of its wall at the discharge end a screw shaped member fixed to the inner wall of said body for feeding material from its receiving end to its discharge end and adapted to rotate with said body, collar means partially closing off said receiving end, said screw-shaped member being perforated along at least a portion of the flight of said screw, and stirring means including a plurality of rods extending through and fixed to said screw-shaped member in a longitudinal direction and spaced from the walls of said tubular body.

2. The apparatus of claim 1 wherein said discharge end is provided with means partially closing it off.

3. Apparatus for separating whey from cut coagulated milk comprising a substantially horizontal tubular body open at opposite ends, said body being stepped in progressively smaller diametrical portions from adjacent one end to the opposite end, with the larger diametrical portion being its receiving end, a screw shaped member fixed to the inner wall of the body for weeding material from its receiving end to the opposite end, stirring means in said body and connected to said screw member, said stirring means being a plurality rods extending through said screw-shaped member in a longitudinal direction, said body being perforated along at most a portion of its wall toward the opposite end, said screw member being perforated along the flight of said screw and collar means partially closing off the receiving end.

4. Apparatus for separating whey from cut coagulated milk, comprising a tubular body open at opposite ends and having its longitudinal axis vertically inclined with respect to the horizontal plane, the vertically lower open end of said body being the receiving end and the opposite end therefrom the discharge end, said body being perforated along at most a portion of its wall toward the discharge end, means supporting said body to permit it to be rotated, a screw shaped member fixed to the inner wall of said body for feeding material from its receiving end to its discharge end and adapted to rotate with said body, collar means partially closing off said receiving end, said screw shaped member being perforated along at least a portion of its wall, and stirring means including a plurality of rods extending through said screw-shaped member in a longitudinal direction.

References Cited by the Examiner
UNITED STATES PATENTS

| 889,159 | 5/08 | Trump | 210—403 X |
|---|---|---|---|
| 1,098,076 | 5/14 | Adt | 210—403 |
| 1,279,949 | 9/18 | Waterman | 210—403 |
| 2,536,054 | 1/51 | Harrington | 31—48 |
| 2,664,204 | 12/53 | Hurter | 210—403 |

FOREIGN PATENTS

| 82,277 | 3/57 | Denmark. |
|---|---|---|
| 497,522 | 3/19 | France. |

ANTONIO F. GUIDA, *Acting Primary Examiner.*

ALDRICH, F. MEDBERY, T. GRAHAM CRAVER,
*Examiners.*